United States Patent [19]

Colegrove

[11] 4,219,362
[45] Aug. 26, 1980

[54] SAG RESISTANT PORTLAND CEMENT COMPOSITIONS

[75] Inventor: George T. Colegrove, San Diego, Calif.

[73] Assignee: Merck & Co., Inc., Rahway, N.J.

[21] Appl. No.: 16,259

[22] Filed: Feb. 28, 1979

[51] Int. Cl.$^2$ ............................................. C04B 7/352
[52] U.S. Cl. ........................................ 106/92; 106/93
[58] Field of Search ................................. 106/92, 93

[56] References Cited

U.S. PATENT DOCUMENTS

| 2,655,004 | 10/1953 | Wertz | 106/93 |
|---|---|---|---|
| 2,934,932 | 5/1960 | Wagner | 106/93 |
| 3,243,307 | 3/1966 | Selden | 106/93 |
| 3,486,960 | 12/1969 | Fitzgerald et al. | 106/92 |
| 3,847,630 | 11/1974 | Compernass et al. | 106/93 |
| 4,021,257 | 5/1977 | Bernett | 106/90 |

Primary Examiner—James Poer
Attorney, Agent, or Firm—Gabriel Lopez; Hesna J. Pfeiffer; Julian S. Levitt

[57] ABSTRACT

Cold-water-soluble tamarind gum is used to prepare portland cement compositions having improved anti-sag control.

8 Claims, No Drawings

SAG RESISTANT PORTLAND CEMENT COMPOSITIONS

BACKGROUND OF THE INVENTION

Portland cement compositions used as grouts and mortars generally contain a filler such as fine limestone or marble dust, a water soluble organic thickener for water retention, and until recently asbestos for sag control. The use of asbestos, however, has been severely curtailed or totally proscribed for safety reasons. A search for an asbestos substitute has yielded additives such as certain long-chain organic polymers, described in U.S. Pat. No. 4,021,257 and certain metal salts, described in U.S. Pat. No. 4,082,563.

SUMMARY OF THE INVENTION

It has now been found that a form of tamarind gum, described herein as cold-water soluble tamarind gum (CWSTG), is highly effective for controlling water losses to porous substrates. It thus can be used in a variety of applications including petroleum drilling fluids and cements to reduce the amount of water lost to porous underground formations. CWSTG has now also been found to impart to Portland cement compositions a high degree of resistance to sag. This combination of water retentivity and sag resistance makes CWSTG particularly useful in masonry applications to prevent water loss from cements into porous wood or stucco substrates. It is especially useful in dry set mortars and grouts particularly in setting porous tiles on vertical walls.

DETAILED DESCRIPTION OF THE INVENTION

The cement compositions of this invention contain 30–99.5% Portland cement, 0–70% filler, and 0.5–3.0% (preferably <2.0%) cold-water soluble tamarind gum (CWSTG). Optionally, cellulose derivatives known in the art for their water retentive properties such as cellulose ethers or hydroxypropyl methyl-cellulose may be used at levels of 0.4–1.2%. When such cellulose derivatives are used the amount of CWSTG used is 0.001–1%, preferably 0.1–0.5%.

The types of filler that can be used are also well known in the art and include sand, limestone, clays, mica, talc, calcium carbonate, and the like.

By dry set mortars and grouts is meant Portland cement compositions that do not require that porous tiles be pre-soaked prior to being set in the mortar or to being grouted. These dry set compositions typically contain Portland cement and sand and either one or a combination of water retentive agents, thus obviating the need for pre-soaking of the tile. Grouts, also called pointing compounds, generally contain cement and sand in about a 1:1 ratio, whereas mortars generally have a lower percentage of cement. However, these terms are best understood not by specific ratios of compositions but rather by their functional uses; i.e., grouts are mortars used for filling spaces in masonry or tile work and mortar is an adhesive, plastic cement composition which hardens. Methods of preparing dry-mix mortars, varying ingredients for different properties (e.g., lower freezing point, high strength, fast setting, waterproof, different colors, etc.), and applying the wetted mixes to masonry or dry walls are all well known in the art.

U.S. Ser. No. 959,120, filed Nov. 11, 1978, now copending is incorporated herein for its teaching of how to make CWSTG from TKP.

TKP is defined herein as tamarind kernel powder obtained from the seed kernels of the tree, *Tamarindus indica* (Linn), resulting from husking and milling of these seed kernels. TKP includes all of the constituents found in the tamarind seed kernel: polysaccharide (composed of uronic acid and the neutral sugars arabinose, xylose, mannose, glucose, and galactose), protein, and any other cellular debris from the tamarind kernel seed. This TKP is crude and insoluble in cold water (in the range of 5°–35° C.).

There exist in the art several purification methods for making a cold-water soluble product from TKP. U.S. Pat. No. 3,287,350 teaches the art of purifying TKP to obtain tamarind seed jellose (TSJ), the polysaccharide constituent of TKP. The process specifies bleaching of the coarsely ground tamarind seed kernels which are then dispersed in a 25-fold amount of water. After injection of steam, the solution is filtered and the TSJ precipitated by using a sulfate and alcohol. U.S. Pat. No. 3,399,189 teaches the art of making a cold-water soluble product from TKP by extracting the polysaccharide from tamarind seed kernels with isopropanol at ~80° C., the polysaccharide then being dispersed in a 25- to 35-fold amount of water. Injection of steam and subsequent filtration yield a cold-water-soluble product which is recovered from solution by roll drying or precipitation with an organic solvent.

CWSTG is prepared by a method which does not require purification. This product is similar in appearance and physical properties to TKP; it is a dry, crude TKP product containing all of the TKP constituents but exhibiting cold-water solubility.

It is understood by those in the art the TKP is a commercially available crude product which has trace impurities which vary from shipment to shipment. These impurities comprise metal shavings, wood pulp, cellulose from tamrind seed husks, and other plant parts and inorganic impurities. Many of these impurities are inherently insoluble in water and are excluded from the scope of the definition of CWSTG.

CWSTG is made by mixing TKP in water at concentrations of 0.1 to 75%, heating this mix to a temperature of 35°–130° C., and then drying (and optionally milling) the resulting CWSTG. The heating and drying steps can be combined, as in the drum drying process. The milling step is preferred so as to produce minute particles which readily hydrate.

TKP subjected to this process exhibits cold-water solubility. As indicated, this process does not require the addition of bleaching agents, or any precipitation and/or filtration steps to yield CWSTG. The process gives yields of approximately 100%. The constraints inherent in said process are governed by temperature, time, and pressure relationships; i.e., at lower temperatures, longer periods of time are required to develop full solubility.

CWSTG can be defined in terms of the viscosity of a solution prepared with cold water (i.e., 5°–35° C.). A CWSTG aqueous solutions prepared by adding CWSTG powder to cold water and mixing under moderate shear (e.g., Lightnin Mixer at 800–1,000 rpm) for one hour develops a viscosity of greater than 10 cP (Brookfield LVF viscometer, spindle 1, 60 rpm) at a 1% concentration and greater than 1,000 cP (Brookfield LVF viscometer, spindle 3, 60 rpm) at 10% concentration.

Heating of the TKP/water mix can be accomplished by various methods, including, but not limited to, infrared irradiation, conventional steam heating, drum drying, and microwave heating. The temperature range necessary to achieve cold-water solubility is from 35° C. to just below degradation temperature of TKP; preferably 35°-130° C. TKP held at lower temperatures requires a longer time for viscosity to develop and does not develop the same viscosity as TKP held at higher temperatures. The optimum temperature range is 70°-100° C. at atmospheric pressure.

It is preferred when making CWSTG that the TKP concentration range from 4% to 60%. A still more preferred range is 20% to 50%.

The following preparations show three processes for making CWSTG.

PREPARATION 1

Cold-water soluble tamarind gum

TKP is dispersed in water to a concentration of 20%, heated to 95° C. for 10 minutes, then dried and milled to produce CWSTG. This gum is dissolved in water at 20° C. and develops a viscosity of 35 cP at 1% concentration, measured on a Brookfield LVF viscometer, spindle 1, 60 rpm.

PREPARATION 2

Cold-water Soluble Tamarind gum

TKP is dispersed in water at ambient temperature at a concentration of 40%. The resulting paste is drum dried with internal steam pressure at 40 psi, and then milled. The resulting product (CWSTG) readily dissolves in ambient-temperature water and imparts a viscosity of 30 cP at 1% concentration, measured on a Brookfield LVF viscometer, spindle 1, 60 rpm.

PREPARATION 3

Cold-water Soluble Tamarind Gum

A paste is prepared by stirring while heating 55 lbs. TKP in 9 gal. H₂O. The paste is heated at 82° C. for 5 minutes. The paste is extruded, dried at 71°-77° C. and then milled through a 30 mesh screen to obtain CWSTG.

Because of its superior water retentive property, CWSTG can be used to control the fluid loss of oil well drilling, workover and completion fluids. CWSTG can be used by itself or in combination with other drilling fluid or workover and completion fluid additives. These additives include bentonite, lignosulfonates, CMCs, HECs, starches, calcium carbonate, and others. CWSTG is used at levels from 1.0 to 8.0 lb/bbl in fresh water and all typical oil field salt waters (i.e., sea water, KCl water, NaCl water, etc.).

As "sag resistance" can be a very subjective property, a standard has been devised to quantitatively measure it. The standard is referred to herein as Test Method 1.

TEST METHOD 1

The American National Standards Specification A118.1-1967 is used to compare various mortar formulations for their sag resistance. The following procedure is followed:

The mortar, ¼" thick, is placed on a porous cinder block, a standard ceramic tile is lightly tapped in place, then the tiled surface is turned to the vertical position. After 2 hours the amount of sag is measured and rated. Sag is rated as follows:

| | |
|---|---|
| less than 1/32" | excellent |
| 1/32" to ⅛ | very good |
| ⅛" to ¼" | good |
| ¼" to 1" | fair |
| greater than 1" or | |
| loss of tile | poor |
| cracking | poor |

EXAMPLES 1-9

Two dry-set mix (DSM) formulations are prepared using three different gums and combinations thereof. The formulations have the following compositions:

| | DSM I | DSM II |
|---|---|---|
| Type I/II Portland Cement | 100 g | 200 g |
| Silica Sand, 60 grade | 100 g | — |
| Gum | 1-2 g | 1-2 g |
| Tap water | 25 ml | 35 ml |

The gums used are hydroxypropyl methylcellulose (Methocel K4MS, Dow Chemical Co.), carboxymethylhydroxyethyl cellulose (CMHEC), (Hercules, Inc.) and CWSTG prepared as in Preparation 3.

Following the procedure of Test Method 1, the following data are obtained which clearly show the superior anti-sag control of CWSTG over prior art gums either alone or in combination with these prior art gums.

| Sample | Gum | DSM | Sag (in.) |
|---|---|---|---|
| A. | Prior Art | | |
| 1 | 1% K4MS | II | ⅛ |
| 2 | 1% K4MS | I | 17/32 |
| 3 | 1% CMHEC | II | 19/32 |
| B. | CWSTG | | |
| 4 | 0.6% CWSTG | I | 1/16* |
| 5 | 0.9% CWSTG | I | 1/16 |
| 6 | 1.5% CWSTG | II | <1/32 |
| C. | Combinations | | |
| 7 | 1% K4MS 0.25% CWSTG | II | 1/16 |
| 8 | 1% K4MS 0.5% CWSTG | II | 1/16 |
| 9 | 1% CMHEC 0.5% CWSTG | II | <1/32* |

*cracked

EXAMPLES 10-13

200 g of Type II Portland cement are dry blended with various gums; then 70 ml water is added and a smooth mix is prepared. Using Test Method 1, the following data are obtained. A comparison of sample 10 with 11-13 shows the improved sag resistance obtained with CWSTG either alone or in combination with prior art gums.

| Sample | Gum | Amount (g) | Sag |
|---|---|---|---|
| 10 | Hydroxypropyl methylcellulose | 2.0 | ⅛" |
| 11 | CWSTG | 2.0 | 1/32" |
| 12 | CWSTG | 3.0 | <1/32" |
| 13 | K4MS | 2.0 | 1/16 |

-continued

| Sample | Gum | Amount (g) | Sag |
|---|---|---|---|
| | CWSTG | 0.5 | |

EXAMPLES 14–16

100 g Portland cement, 100 g sand, and various gums are dry blended; then 50 ml water is added and a smooth mix is prepared. Using Test Method 1, the following data are obtained:

| Sample | Gum | Amount (g) | Sag |
|---|---|---|---|
| 14 | K4MS | 2.0 | 17/32" |
| 15 | CWSTG | 1.8 | 1/16" |
| 16 | CWSTG | 2.0 | <1/32" |

Here again the superior results obtained with CWSTG are shown.

What is claimed is:

1. A cement composition comprising 30–99.5% Portland cement, 0–70% filler, and 0.5 to 3.0% cold-water soluble tamarind gum.
2. A cement composition of claim 1 containing less than 2.0% cold-water soluble tamarind gum.
3. A cement composition of claim 2 comprising about 49–50% Portland cement, about 49–50% filler, and about 0.5–2% cold-water soluble tamarind gum.
4. A cement composition of claim 1 comprising about 99% Portland cement and about 1% cold-water soluble tamarind gum.
5. A dry set mortar comprising a cement composition of claim 1 and water.
6. A grout comprising a cement composition of claim 1 and water.
7. A cement composition comprising 30–99.5% Portland cement, 0–70% filler, 0.4–1.2% cellulose derivatives, and 0.001 to 1% cold-water soluble tamarind gum.
8. A cement composition of claim 7 comprising about 99% Portland cement, about 1% hydroxypropyl methylcellulose, and about 0.1 to 0.5% cold-water soluble tamarind gum.

* * * * *